June 17, 1947. H. HANSEN ET AL 2,422,237
PRESSURE CONTROL VALVE
Filed April 21, 1945
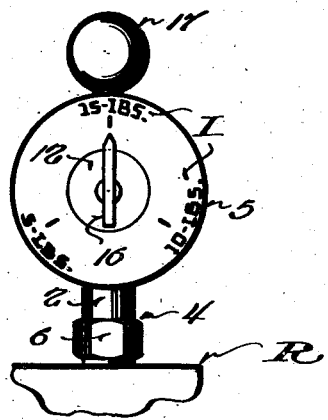
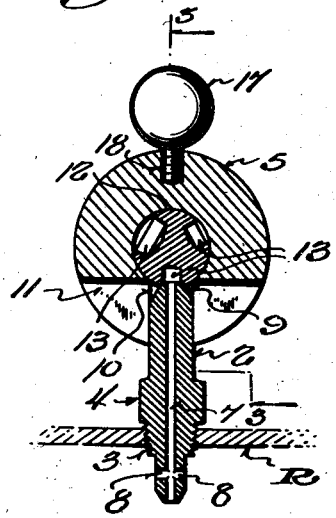 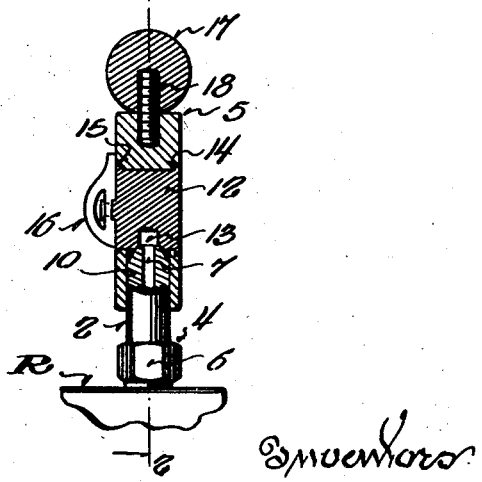
Inventors
Harold Hansen
Lawrence Seefeldt Patented June 17, 1947

2,422,237

UNITED STATES PATENT OFFICE 2,422,237

PRESSURE CONTROL VALVE

Harold Hansen and Lawrence Seefeldt, Manitowoc, Wis., assignors to Aluminum Goods Manufacturing Company, Manitowoc, Wis.

Application April 21, 1945, Serial No. 589,678

6 Claims. (Cl. 137—53)

This invention pertains to pressure contiol valves, and more particularly to gravity type valves in connection with domestic cookers or similar pressure receptacles.

Our co-pending application Serial No. 589,677, filed April 21, 1945, discloses a valve of the above character, in which a weight is selectively seated in different positions upon an exhaust vent communicating with the interior of a receptacle, to maintain one of a plurality of predetermined pressures within the receptacle.

The present invention has primarily for its object to provide a valve of the foregoing type, in which selectivity of a desired predetermined pressure is obtained through regulation of a valve plug positioned within the weight.

A more specific object resides in the provision of a weight loosely seated upon a pressure receptacle vent in one position, and provided with a rotatable plug for selectively determining the amount of pressure to be maintained within the receptacle.

A further object is to provide a valve plug rotatably mounted within a weight, with a plurality of pockets of different capacities for selective engagement with a vent stem communicating with a pressure receptacle to vary resistance to the vent pressure.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Fig. 1 is a front elevational view of a valve incorporating one form of the present invention;

Fig. 2 is a vertical sectional view taken on the line 2—2 of Fig. 3; and

Fig. 3 is a similar view taken on the line 3—3 of Fig. 2.

With particular reference to the accompanying drawing, R designates a fragmentary portion of a pressure receptacle provided with a vent fitting 4 for reception of a weight 5. The fitting 4 consists of a stem 2, having a tapered thread 3 adjacent its lower end for attachment to the receptacle R.

Adjacent the thread 3 the stem is provided with an external tool receiving surface 6, while a vent passage 7 extends axially through the fitting 4 and communicates at its lower end with radial openings 8 to release steam from the receptacle. The upper end of the fitting 4 is provided with an external tapered seat 9 surrounding the axial vent 7.

The weight 5 is provided with a recess 10 for reception of the fitting 4, the recess communicating with a transverse kerf or slot 11 for the exhaust of pressure when the valve is unseated.

Rotatably mounted within the weight 5 is a valve plug 12 provided with a plurality of radial pockets 13 of different capacities, each of the pockets being slightly chamfered to snugly engage the tapered seat 9 of the vent fitting 4.

One end of the plug 12 is provided wtih a flange 14, while its opposite end is peened over at 15 to lock the plug against axial movement within the weight 5. A dial handle 16 is riveted or otherwise secured to the plug for rotating the plug within the weight to selectively present the pockets 13 to the vented fitting 4 in accordance with suitable indicia provided on the face of the weight. A ball 17, preferably formed of plastic or poor heat conducting material is secured to the weight 5 by a threaded stud 18, which facilitate handling of the weight when the same becomes heated. Also, if desired, the weight 5 can be formed of plastic or low heat conducting material to facilitate handling of the valve by the operator.

In operation, pressure is generated within the receptacle R, in the absence of the weight 5, and after air is expelled from the receptacle, which is indicated by a trickle of steam, the weight is placed upon the fitting 4, with the plug 12 adjusted to select one of the pressures indicated on the weight. After the valve is seated and the desired pressure is generated within the receptacle, the weight will vibrate slightly on top of the fitting and permit a small sizzle of steam to escape, after which the heat is reduced to avoid violent dancing of the weight and excessive loss of steam.

When the required cooking period under the pressure selected is reached, the receptacle is removed from the heating element and set into a container of cold water to promptly reduce the pressure, after which the weight is removed from the stem to release any remaining pressure, and thus prevent possibility of injury to the operator through scalding during removal of the cover.

From the foregoing explanation it will be readily seen that an exceptionally simple and inexpensive pressure control valve has been provided for automatically maintaining one of a plurality of selective pressures within a receptacle, by regulation of a plug or movable member provided with a plurality of pockets of different capacities for opposing the steam pressure generated within the receptacle, thus assuring extreme accuracy in operation of the receptacle and eliminating the necessity of shifting the weight to different positions on the vent fitting.

We claim:

1. A pressure control valve comprising a valve stem having a vent passage extending therethrough, a valve body having a recess adapted to fit the valve stem, and a movable plug carried in the valve body, said plug being provided with surfaces of different effective areas and being movable to present said different surfaces in the base of said recess, said surfaces being formed to engage the valve stem and make a seal therewith, said valve body being movable upon the valve stem under excess pressure to release said seal at pressures proportional to said areas.

2. A pressure control valve comprising a valve stem having a vent passage extending therethrough, a valve body having a recess adapted to fit the valve stem, and a movable plug carried in the valve body, said plug being provided with surfaces of different effective areas and being movable to present said different surfaces in the base of said recess, said surfaces being formed to engage the valve stem and make a seal therewith, said valve body being movable upon the valve stem under excess pressure to release said seal at pressures proportional to said areas, said body having a passage formed therein extending laterally from the recess to the periphery of the body.

3. A pressure control valve comprising a valve stem having a vent passage extending therethrough, a valve body having a recess adapted to fit the valve stem, and a movable plug carried in the valve body, said plug being provided with pockets of different effective cross-sectional areas, and being movable to present said different pockets in the base of said recess, the edges of said pockets engaging the valve stem to form a seal therewith, said valve body being movable upon the valve stem under excess pressure to release said seal at pressures proportional to the effective areas of the pockets.

4. A pressure control valve comprising a valve stem having a vent passage extending therethrough and a tapered seat surrounding the passage, a valve body having a recess adapted to fit the valve stem and a rotatable member carried in the valve body, said member being provided with surfaces of different effective areas and being rotatable to present said different surfaces in the base of said recess, said surfaces being formed to engage the tapered seat of the valve stem and make a seal therewith, said valve body being movable upon the valve stem under excess pressure to release said seal at pressures proportional to said areas.

5. A pressure control valve comprising a valve stem having a vent passage extending therethrough and a tapered seat surrounding the passage, a valve body having a recess adapted to fit the valve stem and a rotatable member carried in the valve body, said member being provided with different surfaces and being rotatable to present said different surfaces in the base of said recess, said surfaces having pockets of different effective cross-sectional areas formed therein, the edges of the pockets engaging the tapered seat of the valve stem to form a seal therewith, said valve body being movable upon the valve stem under excess pressure to release said seal at pressures proportional to the effective areas of the pockets.

6. A pressure control valve comprising a valve stem having a vent passage extending therethrough and a tapered seat surrounding the passage, a valve body having a recess adapted to fit the valve stem and a rotatable member carried in the valve body, said member being provided with different surfaces and being rotatable to present said different surfaces in the base of said recess, said surfaces having pockets of different effective cross sectional areas formed therein, the edges of the pockets engaging the tapered seat of the valve stem to form a seal therewith, said valve body being movable upon the valve stem under excess pressure to release said seal at pressures proportional to the effective areas of the pockets, said body having a passage formed therein extending laterally from the recess to the periphery of the body.

HAROLD HANSEN.
LAWRENCE SEEFELDT.

REFERENCES CITED

The following references are of record in the file of this patent:

UNITED STATES PATENTS

| Number | Name | Date |
|---|---|---|
| 893,483 | Gray | July 14, 1908 |
| 2,200,903 | Stevens | May 14, 1940 |
| 1,915,899 | Monro | June 27, 1933 |
| 1,682,203 | Vischer | Aug. 28, 1928 |
| 412,890 | Noack | Oct. 15, 1889 |

FOREIGN PATENTS

| Number | Country | Date |
|---|---|---|
| 232,404 | Great Britain | Apr. 23, 1925 |